United States Patent [19]
Glossop, Jr.

[11] Patent Number: 5,443,095
[45] Date of Patent: Aug. 22, 1995

[54] FLUID BLOCKING DEVICE

[75] Inventor: F. Raymond Glossop, Jr., Tulsa, Okla.

[73] Assignee: TDW Delaware, Inc., Wilmington, Del.

[21] Appl. No.: 289,185

[22] Filed: Aug. 11, 1994

[51] Int. Cl.⁶ .......................................... F16L 55/132
[52] U.S. Cl. .......................................... 138/94; 138/89; 138/97; 137/15; 137/318
[58] Field of Search .............. 138/94, 93, 89, 94.3, 138/97; 137/15, 315, 318, 317

[56] References Cited

U.S. PATENT DOCUMENTS

| | | | |
|---|---|---|---|
| 2,913,012 | 11/1959 | McCurley | 138/94 |
| 3,091,260 | 5/1963 | Milanovits et al. | 138/94 |
| 3,115,163 | 12/1963 | Van Epps et al. | 138/94 |
| 3,120,246 | 2/1964 | Alter | 138/94 |
| 3,991,791 | 11/1976 | Luckenbill | 138/94 |
| 5,186,199 | 2/1993 | Murphy et al. | 138/94 |
| 5,316,037 | 5/1994 | Martin | 138/94 X |

Primary Examiner—David A. Scherbel
Assistant Examiner—Patrick F. Brinson
Attorney, Agent, or Firm—Head & Johnson

[57] ABSTRACT

A fluid blocking device for a pipeline having a saddle fitting over an opening in the wall of the pipeline. The device includes an elongated, resilient plug passable through the pipeline opening to block passage of fluid through the pipeline. A resilient ring around the resilient plug mates with the opening in the pipeline and with the saddle fitting to form a fluid tight seal therewith.

14 Claims, 4 Drawing Sheets

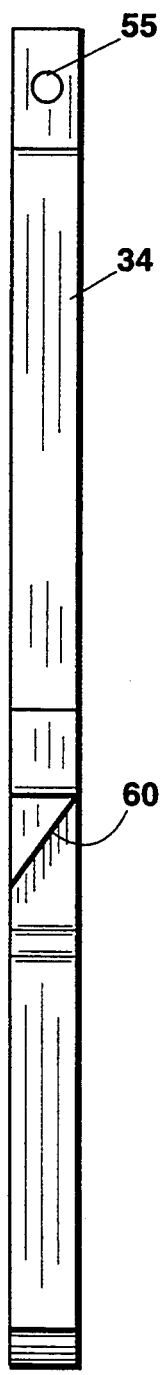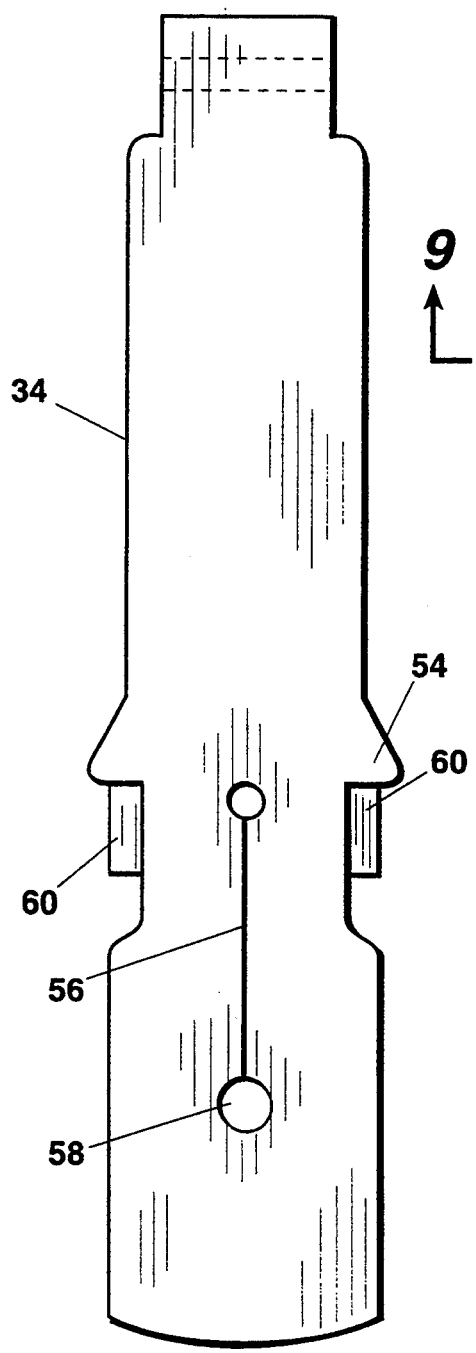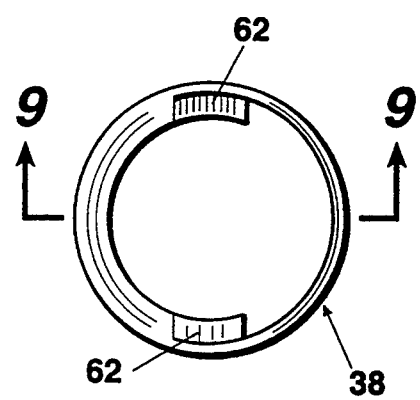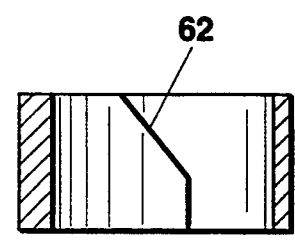
Fig. 6
Fig. 7
Fig. 8
Fig. 9

FLUID BLOCKING DEVICE

BACKGROUND OF THE INVENTION

1. Field of the Invention.

The present invention is directed to a fluid blocking device for a pipeline to form a fluid tight seal between an opening in the wall of the pipeline and a saddle fitting over the opening of the pipeline wall.

2. Prior Art.

Fluid blocking or stopping devices are well known in the pipeline industry. In one type of fluid blocking device, a saddle fitting fits over an opening in the wall of the pipeline. A resilient and deformable elongated plug or blocking plate is movable perpendicular to the axis of the pipeline and through the opening in the pipeline. One type of plug or blocking plate is a flat, flexible, usually elastomer paddle, sealing element or stopper. When moved into place within the pipeline, the plug deforms to the contours of the interior of the pipeline and blocks passage of fluid through the pipeline. The plug is, thus, in fluid tight engagement with the inside wall of the pipeline. It is critical that a fluid tight seal is maintained not only in the pipeline itself but between the saddle fitting and the opening in the pipe. Any deviations can allow fluid to flow.

The resilient plug or blocking plate is forced through the fitting and into the pipeline annulus, by activation of a line stopping device compressed against the pipeline annulus and the fitting until the blocking plate is sealed perpendicular to the pipeline axis.

The saddle fitting is specially designed to allow entry and passage of the blocking plate into the corresponding pipeline. The fitting is attached to the pipeline and tapped through to provide an access hole into the pipeline. When attaching the steel, iron, or plastic fitting, it usually is not possible to weld, fuse, or attach the fitting to the pipeline so that there is a smooth transition surface from the diametrical bore of the fitting to the outside pipeline surface.

The transitional surface may contain voids that increase that portion of the bore between the fitting and the pipeline, or include excessive joining materials that protrude and reduce that transition surface diametrical bore to less than the fitting bore. Additionally, the hole tapped into the pipeline is usually a diameter that is smaller than the fitting bore, providing an irregular transition surface.

There is a need, therefore, for a fluid blocking device that will adequately and totally seal to block the flow of fluid through the pipeline and, at the same time, to prevent fluid flow or leakage between the fitting and the opening in the pipeline wall.

SUMMARY OF THE INVENTION

The present invention provides a fluid blocking device for use where a saddle fitting is fitted over an opening in the wall of a pipeline. The saddle fitting may be secured to the exterior wall of the pipeline through any of the commonly known methods such as mechanical attachment with fasteners, welding, or heat fusion/electrofusion. The heat fusion/electrofusion procedure is used on most thermoplastic pipes.

The fluid blocking device includes an elongated and resilient blocking plate or plug. The plug is moved perpendicular to the axis of the pipeline, through the opening in the pipeline wall. When retracted, fluid flow is allowed to proceed through the pipeline unimpeded. When in the blocking position, fluid is prevented from flowing through the pipeline.

The resilient plug is held in place by a carrier plunger, the exterior surface of which is substantially cylindrical. A circular sealing ring surrounds the outside circumference of the carrier plunger and surrounds the resilient plug. A reduced diameter band on the carrier plunger accommodates the sealing ring therein.

The sealing ring is thickest on the downstream side where an adequate seal is required.

As the resilient plug is moved longitudinally into the compressed position, the sealing ring moves into the cicumferential area where the pipeline opening meets the saddle fitting. As the plug moves, the circumferential ring is forced against the transitional and tapped surfaces.

A pair of plug ramps are provided on the resilient plug in angular relation to the elongated plug.

The sealing ring has a pair of interior sealing ring ramps in angular relation to the axis and to the radius of the ring that mate with the plug ramps on the plug. When the plug is compressed in the pipeline interior, the plug ramps contact the ramps of the sealing ring to force the sealing ring exterior against the irregular transitional and tapped surfaces.

Accordingly, a fluid tight seal is created at the transitional and tapped surfaces.

BRIEF DESCRIPTION OF THE DRAWINGS

FIG. 6 is a side view of the resilient plug apart from the fluid blocking device shown in FIG. 1;

FIG. 7 is a front view of the resilient plug apart from the fluid blocking device shown in FIG. 1;

FIG. 8 is a top view of a sealing ring apart from the fluid blocking device shown in FIG. 1; and FIG. 9 is a sectional view of the sealing ring taken along section line 9—9 of FIG. 8.

DETAILED DESCRIPTION OF THE PREFERRED EMBODIMENTS

Figure 1:
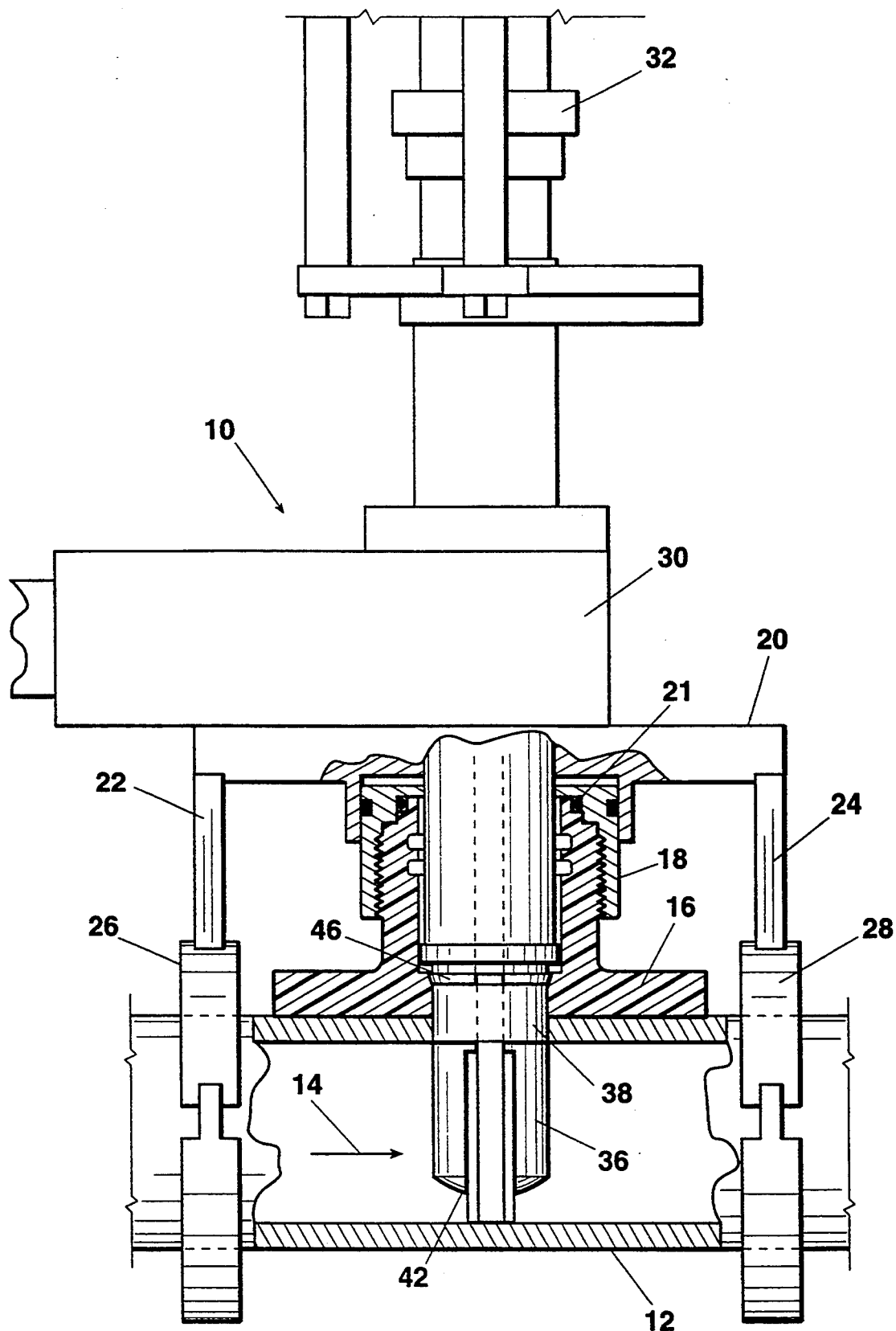
FIG. 1 is a plan view of a fluid blocking device partially cut away to reveal the various elements.

Referring to the drawings in detail, FIG. 1 shows a fluid blocking device 10 partially cut away to reveal various elements of the device. A pipeline 12 is shown in section, cut through the axis of the pipeline, the pipeline having fluid flow in the direction illustrated by arrow 14. A saddle fitting 16 is secured to the exterior wall of the pipeline 12 by electrofusion. While the pipeline and fitting of the present embodiment are of polyethylene, it will be recognized that the invention may be employed with various types of pipelines and fittings.

A fitting adapter sleeve 18 surrounds the upper end of the fitting 16 and is connected to a valve adapting plate 20, which is parallel to the axis of the pipeline. An O-ring 21 may be employed between the fitting and the adapter sleeve.

A pair of plate supports 22 and 24 extend from the adapting plate 20 and connect to a pair of pipe adapting clamps 26 and 28, respectively, surrounding the exterior circumference of the pipeline 12.

The fitting adapter sleeve 18, the valve adapting plate 20 and plate supports 22 and 24 secure the fluid blocking device to the pipeline 12.

The fluid blocking device 10 is then sealed above the fitting with an o ring between a slip joint that is between the sleeve element 18 and adapting plate element 20. This slip joint is designed to not secure the fitting to avoid the internal fluid pressure force against the fluid blocking device to pull the fitting 16 and stress the fusion interface between the fitting and pipeline 12. Normally, polyethylene pipeline tapping is performed shortly after the fusion, and the fused joint is reported to require up to 24 hours before the internal residual stresses balance through plastic creep, so we do not secure to and pull at the freshly fused joint.

A stopper (tapping) valve 30 and line stopping machine 32 are connected to the fluid blocking device 10. The device 10 could be connected to a mechanical type line stopping machine as well as hydraulic, electrical, or pneumatic machines, all as are known in the art.

The fluid blocking device 10 is shown in FIG. 1 in the blocking position so that fluid is prevented from flowing through the pipeline. An elongated and resilient blocking plate or plug 34, to be described in detail, is shown in the blocking position. The resilient plug 34 is moved perpendicular to the axis of the pipeline 12. When retracted, fluid flow is allowed to proceed through the pipeline unimpeded.

The resilient plug 34 is held in place by a carrier plunger 36, the exterior surface of which is substantially cylindrical. As will be described in detail, a circular sealing ring 38 surrounds the outside circumference of the carrier plunger and the resilient plug.

Figure 2:
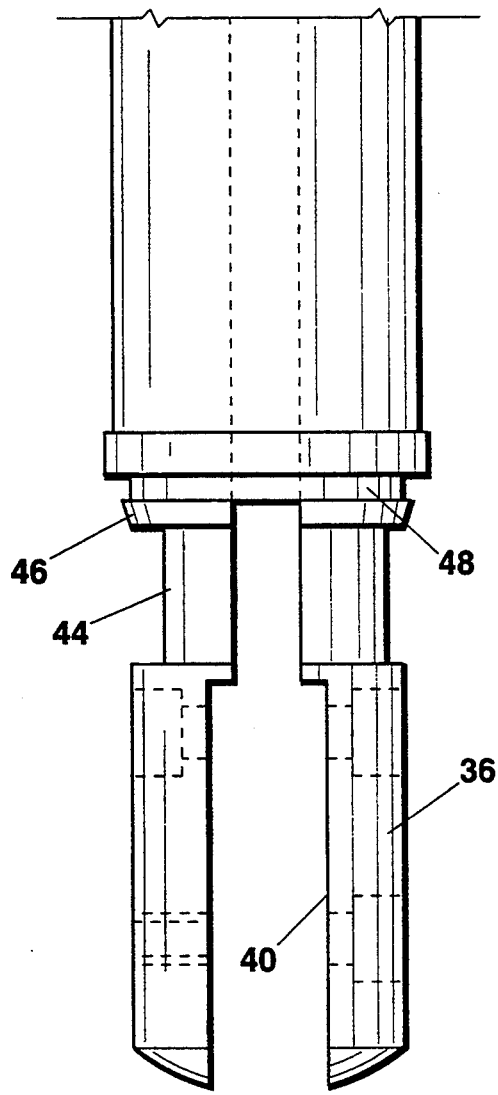
FIG. 2 is a plan view of a carrier plunger apart from the fluid blocking device shown in FIG. 1.
Figure 3:
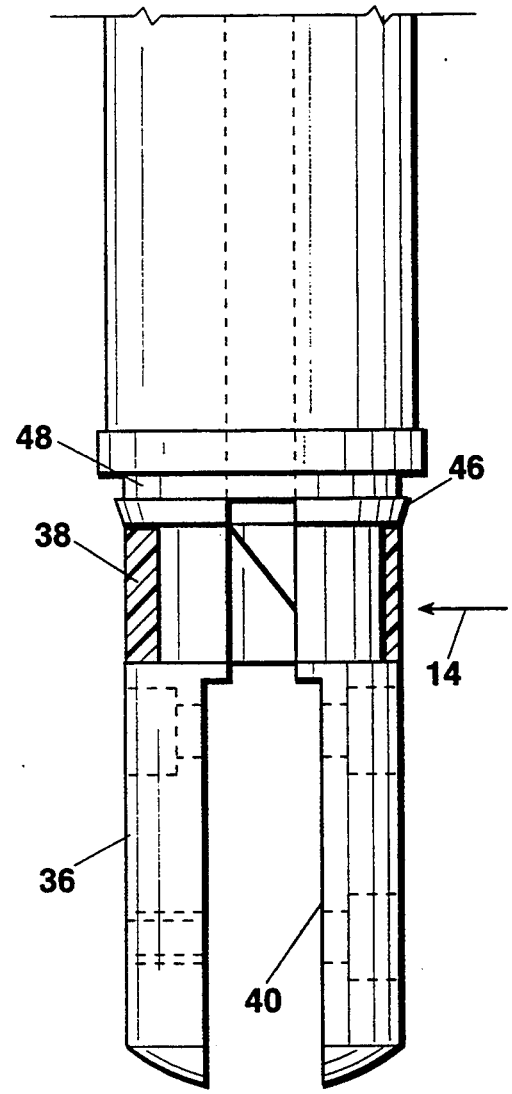
FIG. 3 is a plan view of a portion of the carrier plunger shown in FIG. 2 along with a sectional view of the sealing ring.

FIGS. 2 and 3 illustrate the end of the carrier plunger 36—FIG. 2 alone apart from the device and FIG. 3 with the sealing ring 38 shown in sectional view. The resilient plug (not seen in FIG. 2 and 3) is substantially flat with a pair of opposed flat sides. The resilient plug fits and resides within an opening 40 in the plunger 36. Blocking plate supports or scissors 42 may also reside within the plunger opening 40, as best seen in FIG. 1.

A reduced diameter band 44 on the carrier plunger 36 accommodates the sealing ring 38.

Above and adjacent the reduced diameter band 34 is a protruding circular stop 46 having a larger diameter than the band 34. The stop 46 prevents the sealing ring from moving longitudinally. A circular 0-ring groove 48 may also be provided to receive an o-ring (not shown in FIGS. 2 and 3).

The direction of fluid flow is also seen in FIG. 3 illustrated by arrow 14. It will be observed in FIG. 3 that the sealing ring 38 is thickest on the downstream side where the seal is required.

Figure 5:
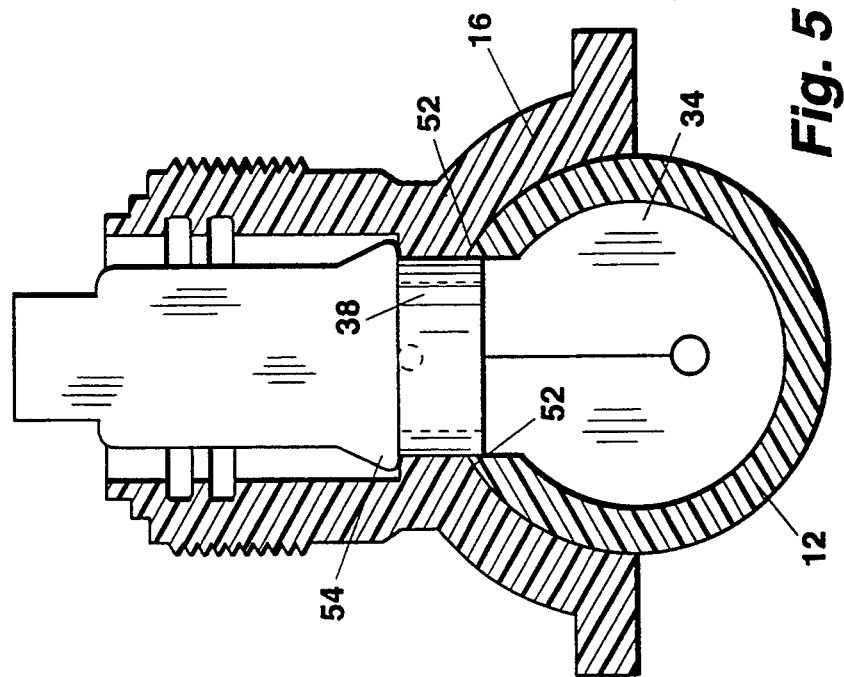
FIG. 5 shows the pipeline, fitting and resilient plug shown in FIG. 4 compressed within the pipeline.
Figure 4:
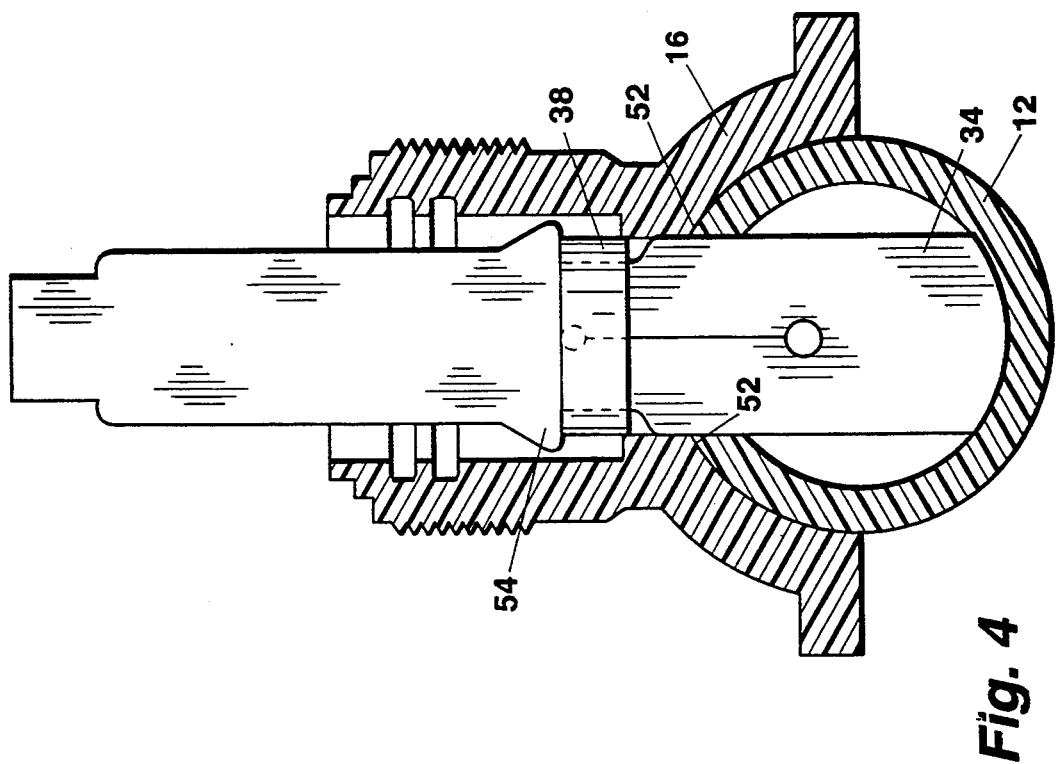
FIG. 4 is a sectional view of the pipeline, saddle fitting and resilient plug of the fluid blocking device shown in FIG. 1 prior to compression.

FIGS. 4 and 5 illustrate the pipeline 12 and the fitting 16 in a sectional view perpendicular to the axis of the pipeline. The carrier plunger and other elements of the fitting have been removed for clarity. In FIG. 4, the blocking plate or resilient plug 34 has been moved into blocking position in the pipeline prior to compression of the plug. FIG. 5, the resilient plug 34 has been compressed so that it is in fluid-tight engagement with the inside wall of the pipeline.

As the resilient plug 34 is moved longitudinally from the FIG. 4 position to the FIG. 5 compressed position, the sealing ring 38 moves into the circumferential area where the pipeline opening meets the fitting as illustrated by dark elements 52. As the plug moves, the circumferential ring is forced against the transitional and tapped surfaces. A fluid tight seal is, thus, assured.

FIGS. 6 and 7 illustrate a side and front view, respectively, of the resilient plug 34 apart from the device 10. The resilient plug 34 includes a pair of extending flanges 54 above the sealing ring. An upper attachment opening 55 may also be provided.

An expansion slot 56 to permit deformation and a lower attachment opening 58 in the resilient plug 34 are also visible.

A pair of plug ramps 60 in angular relation to the plug are provided on the resilient plug 34.

FIG. 8 illustrates a top view of the sealing ring and FIG. 9 illustrates a sectional view of the sealing ring.

The sealing ring 38 has a pair of interior sealing ring ramps 62 in angular relation to the axis and to the radius that mate with the plug ramps 60 on the blocking plate. When the plug is compressed into the pipeline annulus, its ramps 60 contact the ramps 62 of the sealing ring to force the sealing ring 38 against the irregular transitional and tapped surfaces.

Whereas, the present invention has been described in relation to the drawings attached hereto, it should be understood that other and further modifications, apart from those shown or suggested herein, may be made within the spirit and scope of this invention.

What is claimed is:

1. A fluid blocking device for a pipeline having a saddle fitting over an opening in the wall of said pipeline, which device comprises:

an elongated resilient plug passable through said pipeline opening perpendicular to the axis of said pipeline to block passage of fluid through said pipeline; and a resilient sealing ring mounted on said resilient plug and expandable to form a fluid tight seal with said opening in said pipeline, said resilient plug having activation ramps that mate with ramps on said resilient sealing ring.

2. A fluid blocking device as set forth in claim 1 wherein said resilient plug has substantially flat sides held within a carrier plunger, said carrier plunger having a cylindrical exterior and a reduced diameter band for receiving said resilient sealing ring therearound.

3. A fluid blocking device as set forth in claim 2 wherein said carrier plunger has a protruding circular stop adjacent said reduced diameter band to prevent axial movement of said ring.

4. A fluid blocking device as set forth in claim 1 wherein said resilient plug has extending flanges.

5. A fluid blocking device as set forth in claim 1 including means to move said plug into and out of said pipeline perpendicular to the axis of said pipeline.

6. A fluid blocking device as set forth in claim 5 wherein said means to move said plug includes a line stopping machine.

7. A fluid blocking device for a pipeline having a saddle fitting over an opening in the wall of said pipeline, which device comprises:

an elongated resilient plug passable through said pipeline opening perpendicular to the axis of said pipeline to block passage of fluid through said pipeline;

a resilient sealing ring mounted on said resilient plug to mate with said opening in said pipeline and with said fitting to form a fluid tight seal therewith, and means interacting between said plug and said sealing ring to expand said sealing ring to close said pipe wall opening.

8. A fluid blocking device as set forth in claim 7 wherein said plug has substantially flat sides held within a carrier plunger, said carrier plunger having a cylindrical exterior and a reduced diameter band for receiving said sealing ring thereon.

9. A fluid blocking device as set forth in claim 8 wherein said carrier plunger has a protruding circular stop adjacent said reduced diameter band to prevent axial movement of said sealing ring.

10. A fluid blocking device as set forth in claim 7 wherein said means interacting between said plug and said sealing ring is in the form of activation ramps on said plug that mate with ramps on said sealing ring.

11. A fluid blocking device as set forth in claim 7 wherein said plug has extending flanges.

12. A fluid blocking device as set forth in claim 7 including means to move said plug into and out of said pipeline perpendicular to the axis of said pipeline.

13. A fluid blocking device as set forth in claim 12 wherein said means to move said plug includes a line stopping machine.

14. A fluid blocking device for a pipeline having a saddle fitting over an opening in the wall of said pipeline, which device comprises:

an elongated resilient plug passable through said pipeline opening perpendicular to the axis of said pipeline and moveable to a closed position to block passage of fluid through said pipeline; and a resilient sealing ring supported at least in part by said plug and expandable to seal said opening in said pipeline as said plug is moved into said closed position.

* * * * *